United States Patent [19]

Yunoki

[11] 4,172,700

[45] Oct. 30, 1979

[54] HAND-OPERATED INJECTION MOLDING MACHINE

[75] Inventor: Akio Yunoki, Namerikawa, Japan

[73] Assignee: Yoshida Kogyo K.K., Tokyo, Japan

[21] Appl. No.: 850,902

[22] Filed: Nov. 14, 1977

[30] Foreign Application Priority Data

Nov. 17, 1976 [JP] Japan .......................... 51-154781[U]
Nov. 17, 1976 [JP] Japan .......................... 51-154782[U]
Nov. 17, 1976 [JP] Japan .......................... 51-154783[U]

[51] Int. Cl.² .............................................. B29F 1/08
[52] U.S. Cl. ..................................... 425/550; 425/575
[58] Field of Search ............ 425/551, 550, 557, 451.9, 425/DIG. 57, 575, 574, 450.1, 453, 451.5; 249/137, 170, 171

[56] References Cited

U.S. PATENT DOCUMENTS

| | | | |
|---|---|---|---|
| 1,922,937 | 8/1933 | Eckert | 425/575 X |
| 2,253,822 | 8/1941 | Sundback | 425/575 X |
| 3,117,347 | 1/1964 | Barton | 425/575 |
| 3,574,897 | 4/1971 | Citron et al. | 425/550 X |
| 3,590,749 | 7/1971 | Burns et al. | 425/DIG. 57 |
| 3,608,149 | 9/1971 | Morgan | 425/575 |
| 3,892,510 | 7/1975 | Meth et al. | 425/DIG. 57 |

FOREIGN PATENT DOCUMENTS

2020363 11/1971 Fed. Rep. of Germany ........ 425/450.1

*Primary Examiner*—William R. Briggs
*Attorney, Agent, or Firm*—Bucknam and Archer

[57] ABSTRACT

A heating cylinder with a chamber therein is mounted on a base and has a discharge nozzle with an orifice therein, a plunger being movable into the chamber toward the discharge nozzle. A mold holder is supported on the base and has a mold including first and second mold members which jointly provide a mold cavity therebetween. The mold holder is pivotable between a first position in which the mold is held in contact with the discharge nozzle with a sprue in one of the mold members being held in communication with the orifice and a second position in which the mold is located away from the discharge nozzle. There is a means on the base for locking the mold holder in the first position.

5 Claims, 9 Drawing Figures

HAND-OPERATED INJECTION MOLDING MACHINE

BACKGROUND OF THE INVENTION

1. Field of the Invention

The present invention relates to a hand-operated injection molding machine.

2. Summary of the Invention

According to the present invention, a mold holder supported on a base has a mold at one end thereof and is pivotable between a first position in which the mold is held in contact with a discharge nozzle of a heating cylinder and a second position in which the mold is located away from the discharge nozzle. The mold includes first and second mold members jointly providing a mold cavity therebetween, one of the mold members having a sprue communicating with the mold cavity and being separable away from the other. There is a means on the base for locking the mold holder in the first position. The heating cylinder includes a plunger that can be driven by means of a rack and pinion, the pinion having a cam projection on its shaft which is engageable with a cam follower normally biased toward the pinion shaft.

It is an object of the present invention to provide a hand-operated injection molding machine that can be operated speedily and reliably.

Another object of the present invention is to provide a hand-operated injection molding machine having a mold which is movable away from and prevented from being heated excessively by the heating cylinder.

Still another object of the present invention is to provide a hand-operated injection molding machine with its mold separable into a pair of mold members.

Many other advantages, features and additional objects of the present invention will become manifest to those versed in the art upon making reference to the detailed description and the accompanying sheets of drawings in which a preferred structural embodiment incorporating the principles of the present invention is shown by way of illustrative example.

DESCRIPTION OF THE PREFERRED EMBODIMENTS

Figure 1:
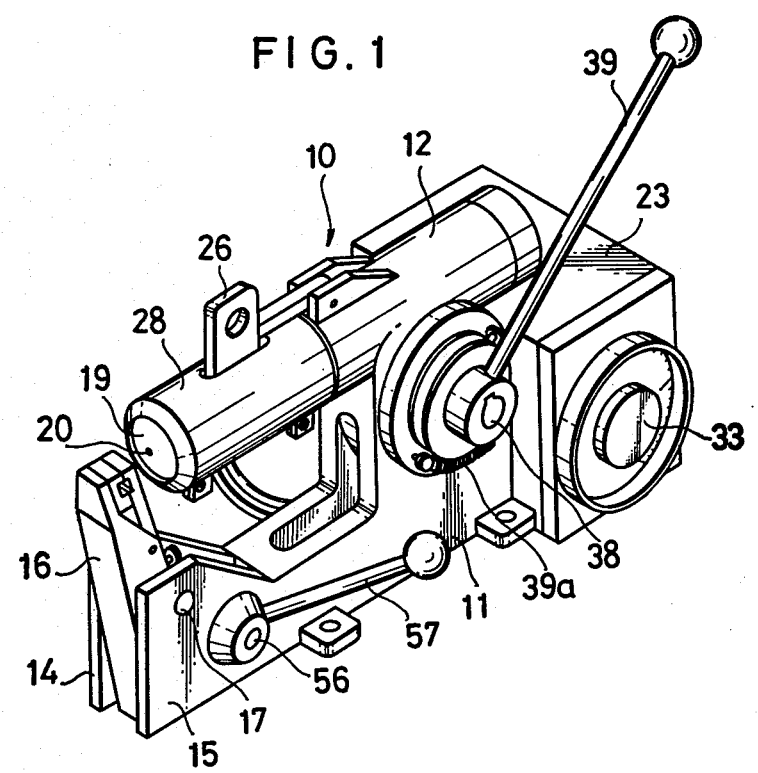
FIG. 1 is a perspective view of a hand-operated injection molding machine constructed in accordance with the present invention.

The principles of the present invention are particularly useful when embodied in a hand-operated injection molding machine such as shown in FIG. 1 generally indicated by the numeral 10. The injection molding machine 10 comprises a base 11 substantially in the form of an L and having a cylinder mount 12 to which a heating cylinder 13 is fixed in overhanging relation to the base 11. The base 11 includes a pair of spaced plates 14,15 between which a mold holder 16 is pivotally supported by means of a pin 17.

Figure 2:
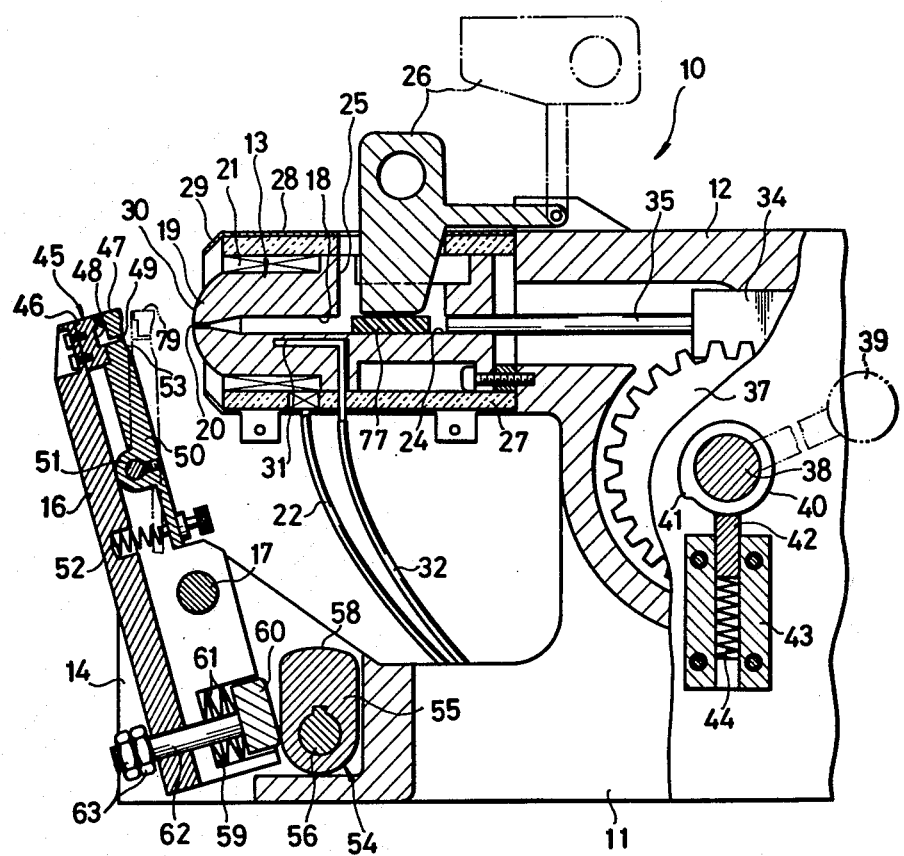
FIG. 2 is an enlarged cross-sectional view of a central portion of the apparatus shown in FIG. 1.

In FIG. 2, the heating cylinder 13 has a heating chamber 18 coaxial therewith and a discharge nozzle 19 at one end thereof, the discharge nozzle 19 having an orifice 20 therein that communicates with the chamber 18. The heating cylinder 13 is circumferentially surrounded by an electric heater 21 which is supplied with electric current through a wire 22 from a control 23 (FIG. 1). The heating cylinder 13 has a loading chamber 24 coaxial therewith and communicating with the heating chamber 18, the loading chamber 24 opening upwardly via a slot 25 through which is movable a molding material pressor 26 pivotally mounted on the cylinder support 12. The heating cylinder 13 is covered on its circumference except the slot 25 with an insulating material 27 around which a protective cover 28 is disposed. The protective cover 28 has an end 29 projecting beyond the insulating material 27 remotely from the cylinder mount 12 and tapered for protecting the insulating material 27 and the electric heater 21. The discharge nozzle 19 has a rounded face 30, a portion of which extends beyond the tapered end 29 of the protective cover 28.

In the heating cylinder 13, there is a temperature sensor 31 adjacent to the heating chamber 18, the temperature sensor 31 being coupled via a wire 32 to the control 23 (FIG. 1) which, depending upon the setting of a selector switch 33, keeps the cylinder 13 heated at a constant temperature.

The cylinder mount 12 contains a rack 34 mounted therein so as to be reciprocatable toward and away from the heating cylinder 13. A plunger 35 is fixed to the rack 34 and extends into the heating cylinder 13, the plunger 35 being movable with reciprocating movement of the rack 34 into the chambers 18,24 toward the discharge nozzle 19 and out of the chambers 18,24 away from the discharge nozzle 19.

A pinion 37 is mounted in the base 11 in driving mesh with the rack 34 and fixed to a shaft 38 for corotation therewith, the shaft 38 being rotatably supported by the base 11. A handle 39 outside the base 11 is fixed to the shaft 38 for rotating it about its own axis and for moving the rack 34 toward and away from the heating cylinder 13. The shaft 38 is normally urged by a spring 39a (FIG. 1) to rotate the pinion 37 clockwise as viewed in FIG. 2 in a direction to retract the rack 34 away from the heating cylinder 13.

Figure 3:
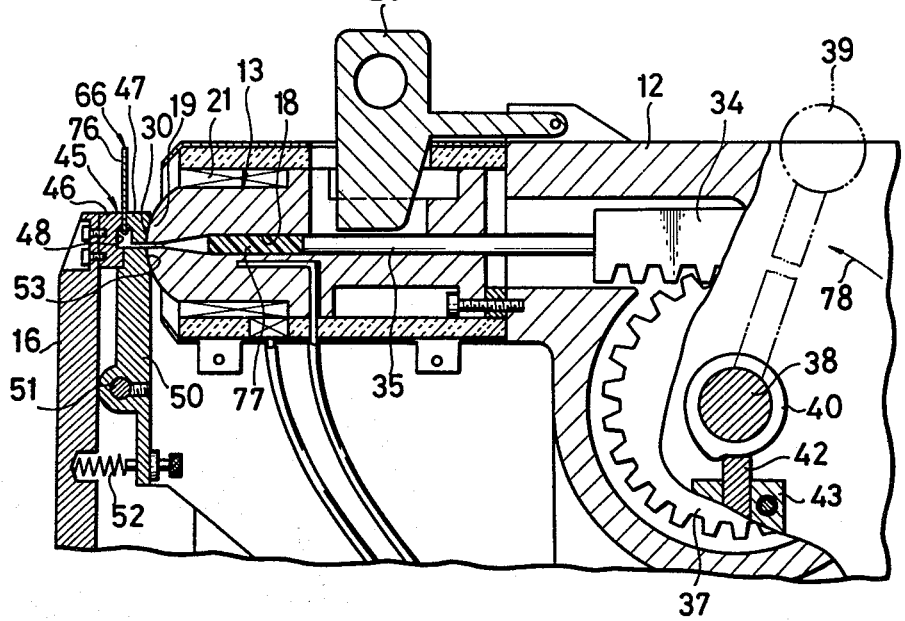
FIGS. 3 and 4 are views similar to FIG. 2, showing sequential steps of operation of the apparatus.
Figure 4:
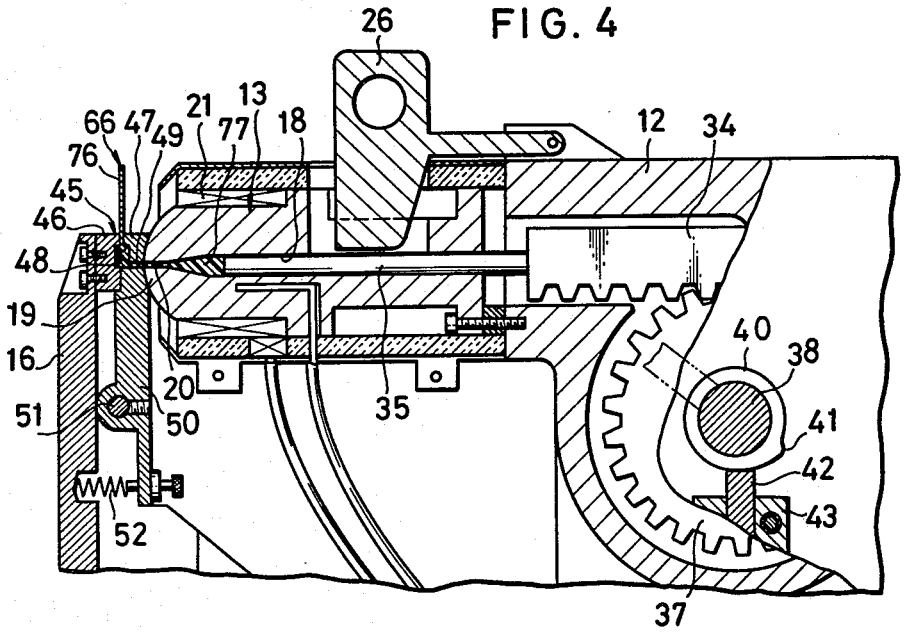

The shaft 38 has a cam 40 disposed therearound, the cam 40 having a cam projection 41. A cam follower 42 is slidably supported in a guide 43 secured to the base 11. The guide 43 has a spring 44 which normally biases the cam follower 42 to engage the cam 40 on the shaft 38. Upon rotation of the shaft 38 in a direction to advance the rack 34, the cam projection 41 becomes engaged with and caught by the cam follower 42 acting as a stop, whereupon the shaft 38 is temporarily prevented from continued rotation (FIG. 3). At this time, the free end of the plunger 35 reaches the entrance of the heating chamber 18 which is remote from the discharge nozzle 19. By rotating the shaft 38 beyond the stopped position with increased force, the cam projection 41 forcibly moves the stop 42 downwardly against the bias of the spring 44. The cam projection 41 is then released of locked engagement with the stop 42, and the shaft 38 is rotated by the force with which the cam projection 41 has displaced the stop 42 out of the way, whereupon the plunger 35 starts moving forward at an increased speed into the heating chamber 18 (FIG. 4).

The mold holder 16 has a mold 45 at one end thereof, the mold 45 including a fixed mold member 46 and a movable mold member 47 which jointly provide a mold cavity 48 therein. The movable mold member 47 has a sprue 49 communicating with the mold cavity 48. The movable mold member 47 is provided on an arm 50 pivotally mounted on the mold holder 16 by means of a pin 51. The arm 50 is normally biased by a spring 52 to cause the movable mold member 47 to be in contact with the fixed mold member 46 for jointly providing the mold cavity 48 therebetween.

The movable mold member 47 has a recessed surface 53 in which the sprue 49 is provided, the recessed surface 53 being located remotely from the mold cavity 48. The recessed surface 53 is complemental in shape to the rounded surface 30 of the discharge nozzle 19. The mold holder 16 is pivotable between a first position in which the mold 45 is held in contact with the discharge nozzle 19 with the sprue 49 in communication with the orifice 20 and a second position in which the mold 45 is located away from the discharge nozzle 19, the mold 45 being movable substantially in the axial direction of the heating cylinder 13 between the first and second positions. The mold holder 16 is normally urged to the second position by gravity.

Between the base plates 14,15, there is a locking means 54 including an eccentric cam 55 fixed to a shaft 56 rotatably supported by the plates 14,15, and a handle 57 (FIG. 1) fixed to the shaft 56 for the rotation thereof about its own axis. The eccentric cam 55 has a surface 58 remote from the shaft 56.

The mold holder 16 has in the other end a recess 59 in which is slidably disposed a pressure plate 60 normally urged by Belleville springs 61 in a direction to project out of the recess 59. The pressure plate 60 is mounted on one end of a rod 62 extending through the mold holder 16, there being nuts 63 threaded on the other end of the rod 62. The nuts 63 are held against the mold holder 16 to retain the pressure plate 60 substantially in the recess 59 against the bias of the Belleville spring 61.

Upon rotation of the shaft 56 by manipulation of the handle 57, the eccentric cam 55 is turned to bring its surface 58 into engagement with the pressure plate 60 in the mold holder 16, whereupon the mold holder 16 starts to pivot from the second to the first position. With the surface 58 of the cam 55 held in face-to-face contact with the pressure plate 60, the mold holder 16 is locked in the first position in which the recessed surface 53 of the movable mold member 47 closely contacts the rounded surface 30 of the discharge nozzle 19. In this position, the pressure plate 60 is pressed by the eccentric cam 55 into the recess 59 and the Belleville springs 61 in turn force the mold holder 16 and hence the mold 45 against the discharge nozzle 19 resiliently with increased force. Accordingly, the movable mold member 47 is held in intimate contact with the discharge nozzle 19, and no leakage will occur in between.

Figure 5:
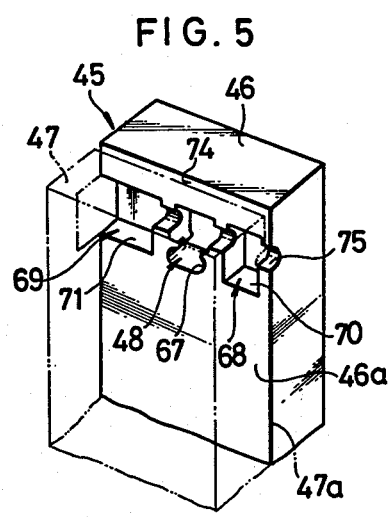
FIG. 5 is an enlarged perspective view, partly shown in phantom, of a mold for use in the apparatus.
Figure 6:
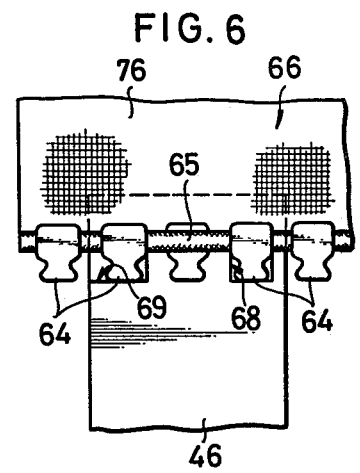
FIG. 6 is a front elevational view of one of mold members with a fastener stringer tape mounted in position for injection-molding a fastener element on the tape.
Figure 9:
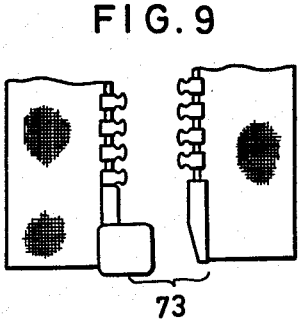
FIGS. 8 and 9 are views illustrating various slide fastener members repairable by the machine.
Figure 8:
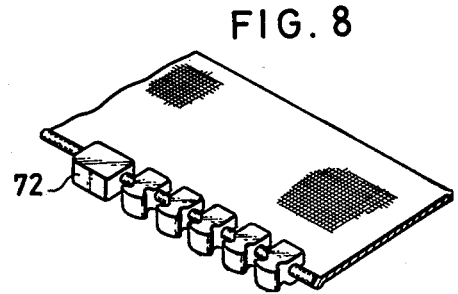

As illustrated in FIGS. 5 and 6, the mold cavity 48 in the mold 45 is in the shape of a fastener element 64 to be injection-molded on a beaded edge 65 of a slide fastener stringer 66. The mold cavity 48 is provided jointly by a pair of cavity halves 67,67 (only one shown) respectively in opposite faces 46a,47a of the fixed and movable mold members 46,47. The mold 45 has two additional cavities 68,69 one on each side of the mold cavity 48, the cavity 68 being provided jointly by a pair of cavity halves 70,70 (only one shown) respectively in the opposite faces 46a,47a of the mold members 46,47 and the cavity 69 by a pair of cavity halves 71,71 (only one shown) respectively in the opposite faces 46a,47a of the mold members 46,47. The cavity 68 receives a fastener element 64 snugly therein and the cavity 69 receives a fastener element 64, or an end stop 72 as illustrated in FIG. 8, or the box or pin part of a separable end stop 73 as illustrated in FIG. 9, the cavity 69 opening to the exterior of the mold 45. The mold cavity 48 is located between and equidistantly from the cavities 68,69 so that the mold cavity 48 is spaced from the fastener elements 64,64 respectively in the cavities 68,69 an element-to-element distance or pitch.

The mold 45 has a clearance space 74 provided jointly by the mold members 46,47 and communicating with the cavities 48,68 and 69, the clearance space 74 opening to the exterior of the mold 45. The mold 45 also has a slot 75 provided jointly by the mold members 46,47 and communicating with the clearance space 74 and with the cavities 48,68 and 69, the slot 75 opening at one end to the exterior of the mold 45. With the mold members 46,47 put together, the clearance space 74 receives therein a fastener stringer tape 76 and the slot 75 receives therein the beaded edge 65 for supporting them firmly between the mold members 46,47 against accidental lengthwise displacement during injection molding.

Figure 7:
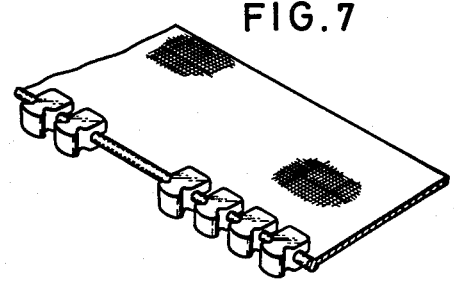
FIG. 7 is fragmentary perspective view of a slide fastener stringer to be repaired by the machine.

The hand-operated injection molding machine 10 according to the present invention has particular utility for injection-molding fastener elements one by one on a beaded edge of a slide fastener stringer. Accordingly, the machine 10 is useful for repairing a slide fastener stringer as shown in FIG. 7 which has lost its fastener elements accidentally. In operation, the handle 57 is manipulated to let the mold holder 16 pivot to the second position by gravity as shown in FIG. 2 and the arm 50 is turned about the pin 51 to bring the movable mold member 47 away from the fixed mold member 46 against the resistance of the spring 52 as shown by imaginary lines 79 in FIG. 2. With the movable mold member 47 kept away from the fixed mold member 46, the fastener stringer tape 76 and the beaded edge 65 are inserted in between the separated mold members 46,47. Then, the arm 50 is pivoted back under the bias of the spring 52 to allow the movable mold member 47 to mate with the fixed mold member 46, whereupon the beaded edge 65 is held in place in the slot 75 and the stringer tape 76 in the clearance space 74. At this time, the cavities 68,69 are occupied with the fastener elements 64,64 thereby preventing longitudinal movement of the fastener stringer 66 across the mold members 46,47.

A molding material 77 is put through the slot 25 into the loading chamber 24 and retained therein by the pressor 26. When the heating cylinder 13 is heated up to a desired temperature, the handle 39 is rotated against the bias of the spring 39a in the direction of the arrow 78 as shown in FIG. 3 until the cam projection 41 abuts against the cam follower 42. At this time, the molding material 77 is placed in the heating chamber 18 and begins to melt with heat. The handle 39 is maintained at rest in this position until the molding material 77 is completely melted.

With the molding material 77 melted, the handle 57 is pivoted to cause the cam surface 58 of the eccentric cam 55 to engage the pressure plate 60 in the mold holder 16; that is, the eccentric cam 55 is turned about the shaft 56 until the mold holder 16 is locked in the first position. The handle 39 is then pivoted further to enable the cam projection 41 to push down the cam follower 42, whereupon the plunger 35 starts moving forward into the heating chamber 18 toward the discharge nozzle 19 (FIG. 4). The melted material 77 is forced by the plunger 35 to flow through the orifice 20 and the sprue 49 into the mold cavity 48 until the cavity 48 is filled up with the melted material 77.

When the injection molding is completed, the handle 57 is returned to allow the cam surface 58 of the eccentric cam 55 to slide out of engagement with the pressure plate 60. The mold holder 61 is then released of locked engagement with the eccentric cam 55 and turned to the second position in which the melted material in the mold cavity 48 becomes cooled and solidified to form a fastener element on the beaded edge 65 of the fastener stringer 66. Upon solidification of the molding material, the arm 50 is pivoted to separate the movable mold member 47 away from the fixed mold member 46 in order to take out the fastener stringer 66 with the formed fastener element thereon.

Since the mold 45 can be spaced away from the heated discharge nozzle 19 while the injection molding is not effected, the mold 45 is prevented from being heated excessively and hence the influence of heat on the existing fastener elements 64 in the cavities 68,69 is held to a minimum. Furthermore, the plunger 35 is caused to travel forward at an increased rate of speed in the heating chamber 18, such that the melted molding materal 77 therein is discharged rapidly out of the nozzle 19. This can shorten an interval of time during which the mold 45 and the heated discharge nozzle 19 contact each other.

The mold cavity 48 may be in the shape of other fastener members such as the end stop 72 (FIG. 8) or the box or pin part of the separable end stop 73 (FIG. 9).

Although various minor modifications may be suggested by those versed in the art, it should be understood that I wish to embody within the scope of the patent warranted hereon, all such embodiments as reasonably and properly come within the scope of my contribution to the art.

I claim as my invention:

1. A hand-operated injection molding machine comprising:
   (a) a base;
   (b) a heating cylinder mounted on said base and having a chamber therein, said heating cylinder having at one end a discharge nozzle with an orifice therein and a plunger movable into said chamber toward said discharge nozzle;
   (c) a mold holder pivotally supported on said base and having a mold at one end thereof, said mold including first and second mold members jointly providing a mold cavity therebetween, said first mold member being fixed to said mold holder, said mold holder supporting an arm pivotally mounted thereon and having at one end said second mold member, bias means for biasing said arm to cause said first and second mold members to be pressed against each other for providing said mold cavity, said second mold member being located between said first mold member and said discharge nozzle, and having a sprue communicating with said mold cavity; and
   (d) means on said base for acting on the other end of said mold holder to pivotally move the mold holder into a position in which said second mold member is pressed against said first mold member and is in contact with said discharge nozzle with said sprue in communication with said orifice, said means including locking means for locking said mold holder in said position.

2. A hand-operated injection molding machine according to claim 1, said mold holder being pivotally movable away from said position by gravity when the mold holder is released of said means.

3. A hand-operated injection molding machine according to claim 1, said means comprising an eccentric cam secured to a shaft rotably supported on said base, and a handle fixed to said shaft, said eccentric cam having a surface remote from said shaft and engageable upon rotation of said said shaft with said mold holder at the other end thereof to retain said mold holder in said position.

4. A hand-operated injection molding machine according to claim 3, said mold holder having on the other end thereof, means engageable with said eccentric cam for resiliently pressing said mold against said discharge nozzle when said mold holder is in said position.

5. A hand-operated injection molding machine comprising: a base; a heating cylinder mounted on said base and having a chamber therein, said heating cylinder having at one end a discharge nozzle with an orifice therein and a plunger movable into said chamber toward said discharge nozzle; a mold holder supported on said base by pivot connection means and having a mold at one end, said mold including first and second mold members jointly providing a mold cavity therebetween, one of said first and second mold members having a sprue communicating with said mold cavity and being separable away from the other, said mold holder being pivotable relative to said base between a first position in which said mold is held in contact with said discharge nozzle with said sprue in communication with said orifice and a second position in which said mold is located away from said discharge nozzle; means on said base for locking said mold holder in said first position; means in said base for driving said plunger, said driving means including a rack fixed to said plunger, a pinion held in driving mesh with said rack and having a shaft rotatably supported by said base, a handle fixed to said shaft, a cam projection on said shaft and a cam follower on said base, said cam follower being normally biased toward said shaft, and said cam projection being engageable with said cam follower when the free end of said plunger reaches the entrance of said chamber which is remote from said discharge nozzle upon rotation of said shaft.

* * * * *